(12) United States Patent
Kirihata

(10) Patent No.: US 8,682,874 B2
(45) Date of Patent: Mar. 25, 2014

(54) INFORMATION PROCESSING SYSTEM

(75) Inventor: Yasuhiro Kirihata, Tokyo (JP)

(73) Assignee: Hitachi Solutions, Ltd., Tokyo (JP)

( * ) Notice: Subject to any disclaimer, the term of this patent is extended or adjusted under 35 U.S.C. 154(b) by 0 days.

(21) Appl. No.: 13/610,188

(22) Filed: Sep. 11, 2012

(65) Prior Publication Data
US 2013/0151492 A1    Jun. 13, 2013

(30) Foreign Application Priority Data

Dec. 8, 2011 (JP) ................................ 2011-269021

(51) Int. Cl.
*G06F 7/00*     (2006.01)
*G06F 17/00*    (2006.01)
*G06F 17/30*    (2006.01)

(52) U.S. Cl.
USPC ........................... 707/696; 707/698; 707/705

(58) Field of Classification Search
USPC ........................................ 707/696, 698, 705
See application file for complete search history.

(56) References Cited

U.S. PATENT DOCUMENTS

| | | | | |
|---|---|---|---|---|
| 7,155,582 B2 * | 12/2006 | Ross | ............................ | 711/158 |
| 2004/0054807 A1 * | 3/2004 | Harvey et al. | ................. | 709/243 |
| 2009/0225674 A1 * | 9/2009 | Kim et al. | ..................... | 370/252 |
| 2010/0268808 A1 * | 10/2010 | Chkodrov et al. | ............ | 709/223 |
| 2011/0296252 A1 * | 12/2011 | Maenpaa | ........................ | 714/48 |
| 2012/0054197 A1 * | 3/2012 | San Martin et al. | ........... | 707/747 |
| 2012/0078948 A1 * | 3/2012 | Darcy | ............................ | 707/769 |
| 2012/0233463 A1 * | 9/2012 | Holt et al. | ..................... | 713/168 |

OTHER PUBLICATIONS

DeWitt et al.; "Parallel Database Systems: The Future of High Performance Database Processing"; Communications of the ACM, 1992; vol. 36; No. 6.

* cited by examiner

*Primary Examiner* — Tony Mahmoudi
*Assistant Examiner* — Merilyn Nguyen
(74) *Attorney, Agent, or Firm* — Mattingly & Malur, PC

(57) ABSTRACT

When an index is partitioned and managed in a plurality of indexes in a search system which deals with large amounts of data, the number of documents registered in each partitioned index may be varied, and inefficient data transfer may occur at the time of index reconfiguration when search nodes are added or deleted. In the present invention, mapping information is used to map search node IDs to slot regions obtained by equally partitioning a circular hash value space in which a start point and an end point of the hash value space are assumed to be identical, so that each document is mapped to each partitioned index.

11 Claims, 14 Drawing Sheets

FIG. 2
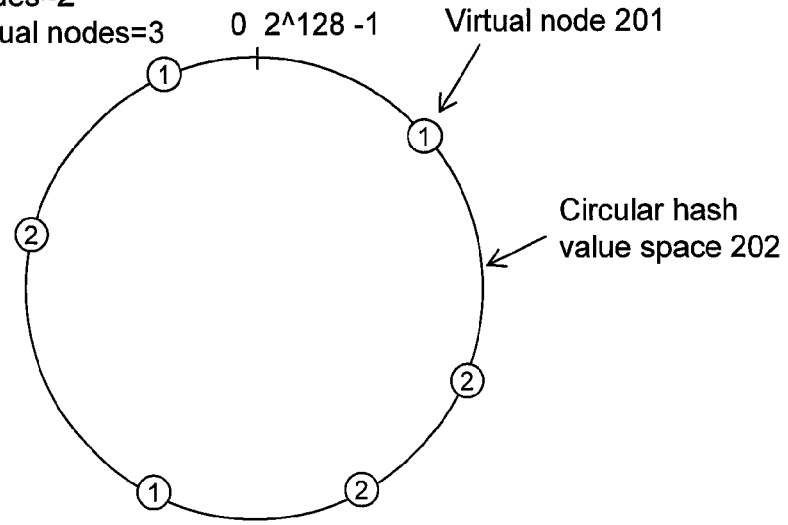
- Number of nodes=2
- Number of virtual nodes=3
0  2^128 -1
Virtual node 201
Circular hash value space 202
Three virtual nodes of node ID = 3 are added to random positions
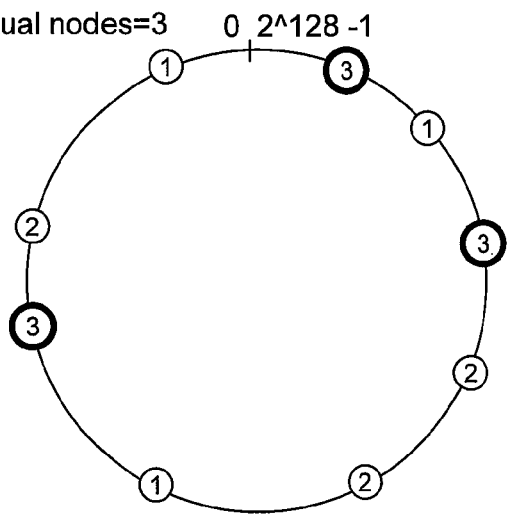
- Number of nodes=3
- Number of virtual nodes=3
0  2^128 -1

FIG. 3
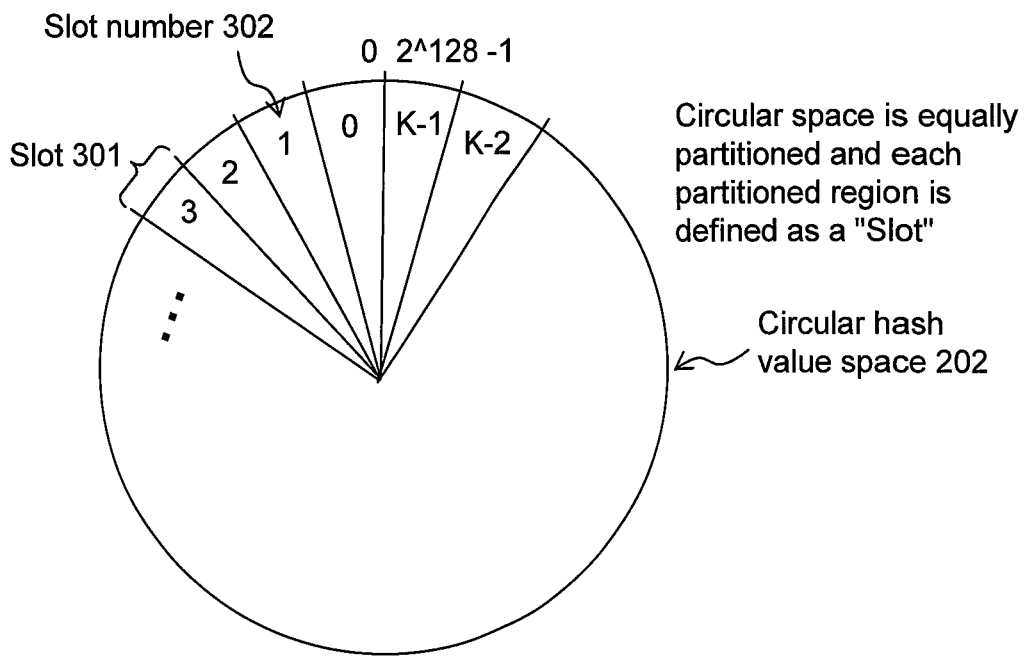
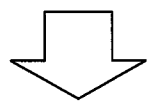
Managed in mapping table of slot numbers and node IDs
| Slot number 302 | Node ID 303 |
|---|---|
| 0 | 12 |
| 1 | 9 |
| ⋮ | ⋮ |
| K-1 | 2 |
Mapping table 304

| Pathname | Hash value | Deletion flag |
|---|---|---|
| ¥¥Server1¥share¥aaa.txt | 23EG43A1TYAW | 0 |
| ¥¥Server1¥share¥bbb.xls | 153RQT66HUI | 0 |
| ⋮ | ⋮ | ⋮ |

601 / 602 / 603

FIG. 13
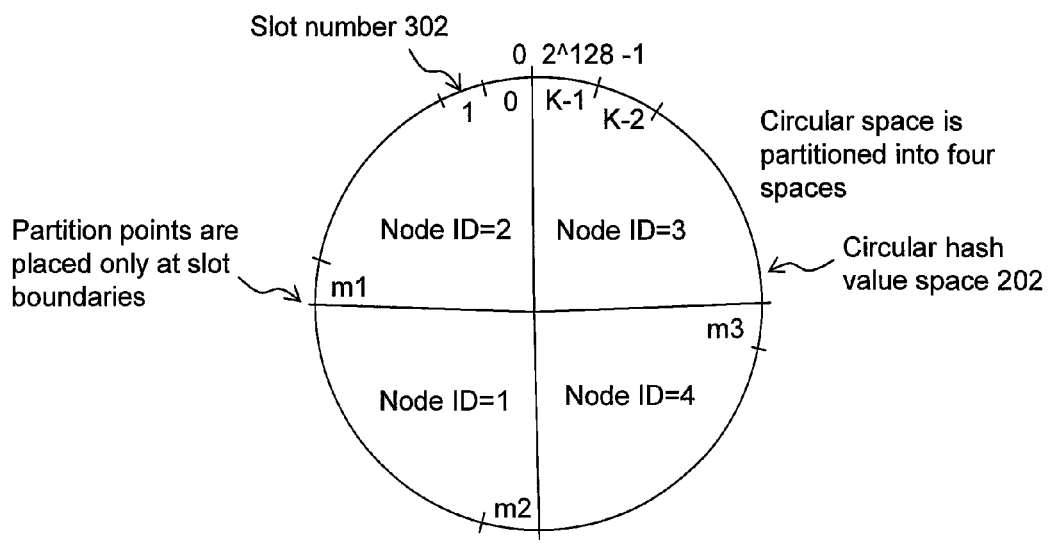
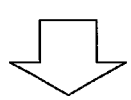

INFORMATION PROCESSING SYSTEM

BACKGROUND OF THE INVENTION

1. Field of the Invention

The present invention relates to an information processing system connected to a file server and more particularly, relates to a technique for index partitioning and management for a search system which deals with large amounts of data.

2. Background Art

With the advent of an era of an explosive increase in information, the amount of data handled by organizations and companies are exponentially increasing. It is said that the significantly increased data are mostly non-structured data such as files. For the improvement of operating efficiency through management and reuse of information, needs for file search technologies in organizations and companies are greatly expanding. In addition to such a background, development and diffusion of bulky data processing technologies and file search technologies of recent years have been promoting use of an enterprise search scheme in companies.

Today, some search systems, which deal with large-scale data, use a scheme of partitioning and placing a target index in a plurality of search nodes and distributing search processing over a plurality of the search nodes in order to maintain search performance at a certain constant level or more. In the search systems which employ this scheme, the index of a document group which is a search object are first divided into a plurality of partitions, and the index after partitioning is registered in corresponding search nodes. In retrieval operation, a query is transmitted to all the search nodes, and search processing with use of each partitioned index is individually performed in each search node. Search results obtained in respective search nodes are totaled at the end, and the totaled result ends up to be a search result of the target index.

When the number of documents which are search targets is large, the index is divided into a plurality of partitions and registered. Consequently, it becomes possible to curb the number of registered documents mapped to one partitioned index. If the created partitioned indexes are distributed and placed in a plurality of search nodes, scale-out of the search performance in large-scale data can be achieved.

Various methods are conventionally employed as a method for registering documents as search targets in one of the partitioned indexes. In one method, a hash value corresponding to an identifier, a file path and the like which identify each document is calculated, and a partitioned index as a registration destination is determined based on the calculated hash value. For example, there is a method in which an MD5 hash value (value calculated by MD5) relating to the pathname of a document (file) which is a registering object is calculated, and the document (file) is allocated to a partitioned index having an ID corresponding to a residue value obtained by dividing the calculated MD5 hash value by the total number of partitioned indexes. In another method, a file path is set as a unique ID, and a partitioned index as a registration destination is more simply determined for every specified folder.

CITATION LIST

Non-patent Literature

Non-patent Literature 1

David J. DeWitt, Jim Gray, "Parallel Database Systems: The Future of High Performance Database Processing", Communications of the ACM, Vol. 36, No. 6, June 1992, January 1992

SUMMARY OF THE INVENTION

Search nodes which constitute a search system are not invariable, and the system configuration nodes may be changed from time to time. For example, a new search node may be added to the search system. In this case, it becomes necessary to move and reconfigure document information to be registered in partitioned indexes.

However, when the method of registering documents in partitioned indexes based on hash values is employed, data needs to be transferred not only from an existing node group to an additional node group but also between existing node groups, which results in deteriorated transfer efficiency. Moreover, in the case of determining partitioned indexes for every specified folder, the number of documents registered in respective partitioned indexes is varied due to difference in the number of files in each folder. Consequently, at the time of executing a distributed search operation, uniform load balance cannot be maintained, resulting in deteriorated search performance.

Accordingly, an object of the present invention is to provide an index partition and management technique which equalizes the numbers of documents registered in respective partitioned indexes used at the time of distributed search while achieving efficient relocation of indexes at the time of addition and deletion of search nodes.

The present invention which accomplishes the above object includes various modifications. In one aspect of the invention, a consistent hashing virtual node mode is applied for distributed management of indexes, the consistent hashing virtual node mode using a circular hash value space having a start point and an end point being assumed to be identical. In another aspect of the invention, a modified consistent hashing virtual node mode is applied, in which a circular hash value space having a start point and an end point being assumed to be identical is equally partitioned into slot regions in advance, and a mapping relation between the partitioned slot regions and nodes is managed. In another aspect of the invention, a modified consistent hashing virtual node mode is applied. In the modified consistent hashing virtual node mode, in which a circular hash value space having a start point and an end point being assumed to be identical is equally partitioned in advance into space regions, and the space regions to be allocated to each node are managed with use of a slot region corresponding to one side of a boundary between the space regions.

According to the present invention, even when an index is partitioned and placed in a plurality of search nodes in the search system which deals with large amounts of data, it becomes possible to equalize the numbers of documents registered in partitioned indexes. According to the present invention, it also becomes possible to efficiently reconfigure partitioned indexes. The problems, configurations, and effects other than above-stated will become apparent in the following description of the embodiments.

BRIEF DESCRIPTION OF THE DRAWINGS

FIG. 2 is a view explaining the concept of a consistent hashing virtual node.

FIG. 3 is a view conceptually explaining a first modified example of the consistent hashing virtual node.

FIG. 13 is a view conceptually explaining a second modified example of the consistent hashing virtual node.

DETAILED DESCRIPTION OF THE PREFERRED EMBODIMENTS

Figure 1:
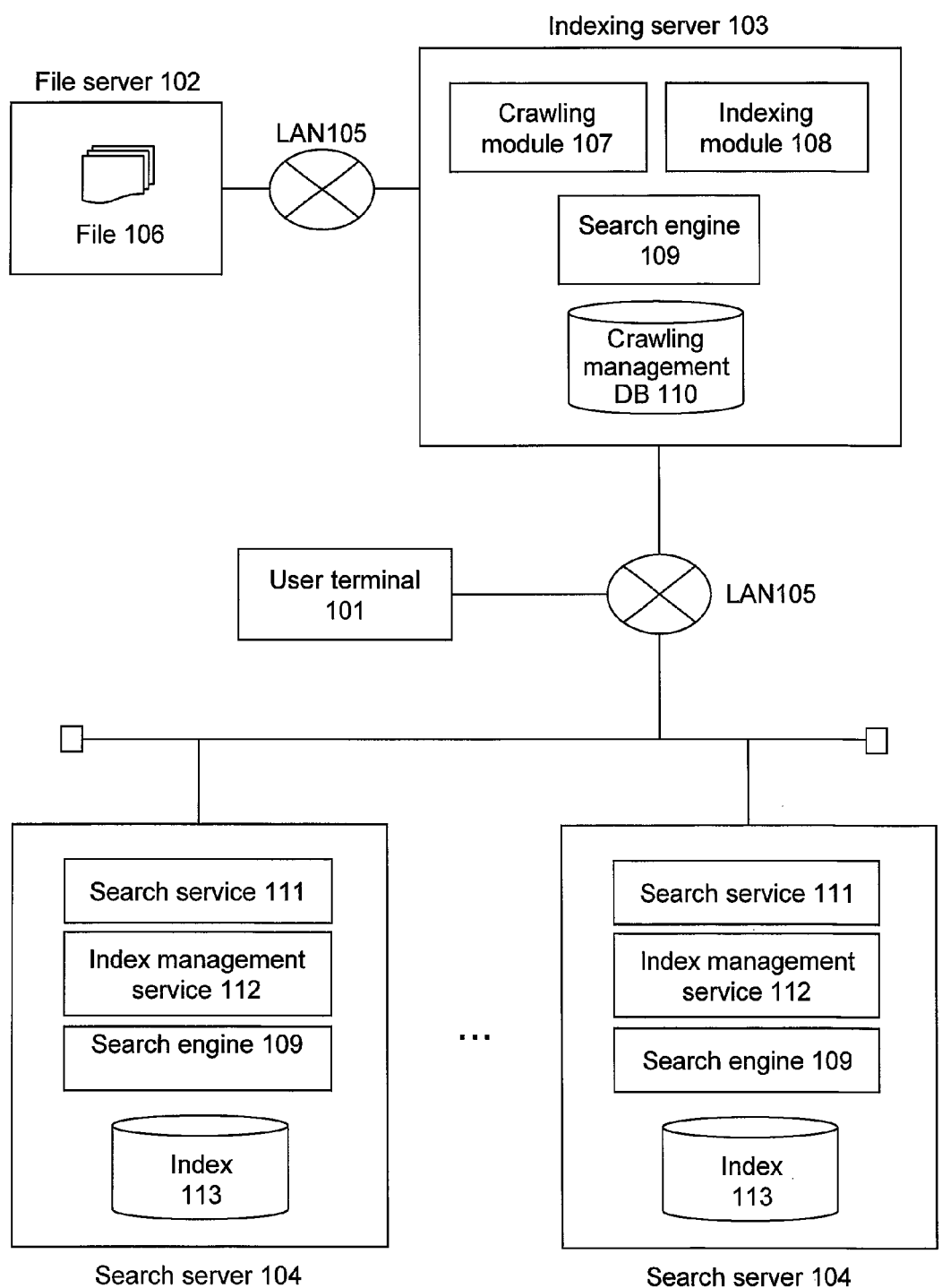
FIG. 1 is a view showing the overall configuration of an information processing system according to an embodiment.

Hereinafter, embodiments of an index partition and management technique according to the present invention will be explained in detail with reference to the drawings. The embodiments of the present invention are not limited to later-described examples, and various modifications are possible in the range of the technical concept of the present invention. It is to be noted that throughout the drawings for explaining the embodiments, identical component members having identical functions are designated by identical reference numerals and characters and repeated explanation will be omitted. In the following embodiments, unless specifically required, descriptions of identical or similar component members are not repeated in principle.

[System Configuration]

FIG. 1 shows an example of the overall configuration of an information processing system commonly used in description of each embodiment. The system is composed of a user terminal 101, a file server 102, an indexing server 103, a search server 104, and a LAN 105. Each server is composed of a computer, a large-scale storage device, and a communication device.

The file server 102 stores a file 106 as a search target. The file server 102 is connected to the indexing server 103 via the LAN 105. The LAN 105 may be of wireless system or wired system. A part of the LAN 105 may use an internet.

The indexing server 103 is connected to the search server 104 via the LAN 105. The user terminal 101 for performing a retrieval operation using the search server 104 is also connected to the search server 104 via the LAN 105.

In the system chart shown in FIG. 1, the indexing server 103 and the search server 104 run on physically different machines. However, these servers may run on physically the same machine.

In the indexing server 103, a crawling module 107, an indexing module 108, a search engine 109, and a crawling management DB 110 are disposed. The crawling module 107 executes a processing to search in the file server 102, detect an updated file, and to download the detected file. The indexing module 108 executes a processing for creating a differential index of the downloaded data. The search engine 109 is a module which provides indexing and search functions. Well-known open source search engines include Apache Lucene and Senna. The search engine 109 is used by the indexing module 108 at the time of creating the differential index. The crawling management DB 110 manages update in a file directory from the last crawling to the present.

In the search server 104, a search engine 109, a search service 111, an index management service 112, and an index 113 are disposed. Upon reception of a search request from a user terminal 101, the search service 111 executes a processing to generate a search result by using the search engine 109 to return a response. The index management service 112 executes updating of the index 113 based on the differential index and a deletion file list created in the indexing server 103. The index management service 112 executes a processing for reconfiguring the index 113 at the time of addition and deletion of the search servers 104 to and from the LAN 105. The reconfiguration processing herein refers to a processing for changing an index that is a registration destination of document data registered in each index when nodes are added and deleted. Mapping information defines which document is registered in which index. In this specification, the mapping information is defined by a later-described consistent hashing virtual node mode or a modified consistent hashing virtual node mode. The mapping information (mapping table) may be managed by the index management service 112 or managed by the indexing server 103 or other servers.

With increase in the number of files stored in the file server 102, the amount of documents registered in the index 113 is increased, which results in a heavier load at the time of search operation. In order to secure constant search performance, it is necessary to keep the number of documents registered in one index within a preset value. Accordingly, as the number of files as search targets increases, more search servers 104 need to be added.

When the search servers 104 are added, the documents registered in each index need to be reconfigured. As described later, costs for moving data between nodes (movement amount and moving time) can be minimized by adopting a mapping method which uses a consistent hashing virtual node mode or a modified consistent hashing virtual node mode.

[Consistent Hashing Virtual Node Mode]

FIG. 2 shows the concept of a consistent hashing virtual node. In this embodiment, MD5 is assumed as a hash function. It is to be noted that the hash function is not limited to MD5 and other hash functions such as SHA1 may be applied instead. MD5 is a 128-bit hash function and it can take a value of 0 to $2^{128}-1$. In this embodiment, a circular hash value space 202 is considered in which 0 and $2^{128}-1$ are assumed to be identical.

Thus, in the circular hash value space 202 having a start point and an end point assumed to be identical, the number of nodes is set to 2 and the number of virtual nodes is set to 3 for example. The node IDs corresponding to these two nodes is set to 1 and 2, respectively. Accordingly, on the circular hash value space 202, three representative points (virtual nodes 201) are plotted for each corresponding node.

In this state, the node ID of a node into which a document D is registered is determined. For the determination, first, an MD5 value of a file path of the document D is calculated, and then the calculated value is plotted on the circular hash value space 202. Then, a pointer is moved counterclockwise from the plotted point, and the node ID corresponding to a virtual node 201 at which the pointer first arrives is obtained. The obtained node ID is determined as the node ID of a node into which the document D is registered. By repeating this procedure, one-to-one mapping of node IDs for all the documents can be implemented. In this specification, this method is called a consistent hashing virtual node mode. It is to be noted that the search direction at the time of searching the node ID may be a clockwise direction.

For physically adding a node of node ID=3 to the information processing system, three virtual nodes 201 corresponding to the node of node ID=3 are plotted at random on the circular hash value space 202. By plotting the virtual nodes 201, new mapping information can be defined. Then, according to the aforementioned procedure, the node IDs to be matched to documents are determined. In this specification, the nodes (nodes of node ID=1 and 2 in this example) which already exist on the circular hash value space 202 are referred to as "existing nodes," and newly added nodes (node of node ID=3 in this example) are referred to as "additional nodes."

By increasing the number of virtual nodes 201 to be matched to one node, the cover range of each node on the circular hash value space 202 can be equalized, and the variance in the number of documents mapped to each node can be decreased.

On the contrary, for physically deleting the node of node ID=3 from the information processing system, three virtual nodes 201 corresponding to the node of node ID=3 are deleted from the circular hash value space 202. Then, according to the aforementioned procedure, the node IDs to be matched to documents are determined.

Thus, even when an index is partitioned and placed in a plurality of search nodes in the search system which deals with large amounts of data, it becomes possible to equalize the numbers of documents registered in partitioned indexes by using the management method according to the present embodiment. According to the present invention, it also becomes possible to efficiently reconfigure partitioned indexes.

[Modified Consistent Hashing Virtual Node Mode (No. 1)]

FIG. 3 shows the concept of a modified version of the above-described consistent hashing virtual node mode. In this embodiment, MD5 is also assumed as a hash function as in the above-mentioned embodiment. As a management space, a circular hash value space 202 is considered in which 0 and $2^{128}-1$ are assumed to be identical.

However, in this embodiment, the circular hash value space 202 is equally partitioned into K spaces, and each unit space is defined as a slot 301. A slot number 302 is allocated to each slot 301 counterclockwise in order from the slot including hash value 0. In this embodiment, the slot number 302 takes a value of 0 to K−1. For each slot number 302, a corresponding node ID 303 is defined. This information is managed in a mapping table 304.

According to this management method, the node ID corresponding to the file path of a given document D can be calculable as in the aforementioned consistent hashing virtual node mode. For example, when the circular hash value space 202 is partitioned into K slots, a space size allocated to each slot 301 is given by $\{2^{128}\}/K$. Therefore, the slot 301 corresponding to slot number X occupies a space region of $\{2^{128}\}X/K - [\{2^{128}\}(X+1)/K]-1$.

In this embodiment, the following procedures determine the node ID corresponding to the document D. First, an MD5 hash value of the file path of the document D is calculated and plotted on the circular hash value space 202, and the slot number X to which the plotted point belongs is obtained. Next, based on the obtained slot number X, the mapping table 304 is referred to obtain a node ID corresponding to the slot number X. As a consequence, the node ID corresponding to the document D is determined.

An advantage of the method according to this embodiment is that the resource amount required for defining mapping information is smaller than that in the consistent hashing virtual node mode according to Embodiment 1. For example, when the number of the search servers 104 to be managed is 1,000, and it is desired to keep the variance in the number of documents registered in each search server 104 within 10% of an average value, the number of virtual nodes to be managed amounts to thousands according to the mode (FIG. 2) in Embodiment 1. Accordingly, a storage region of several GB is needed for storing the mapping information on all the virtual nodes. On the contrary, in the modified consistent hashing virtual node mode according to the present embodiment, the storage region required to keep the variance to the same level is only several dozen of MB, indicating very high resource efficiency.

A description is now given of slot reallocation processing which is executed when the number of search servers 104 which constitute the information processing system is changed. Hereinbelow, the index reallocation processing which is executed when the search servers 104 are added is explained with reference to FIG. 4, and the index reallocation processing which is executed when the search servers 104 are deleted is explained with reference to FIG. 5.

Figure 4:
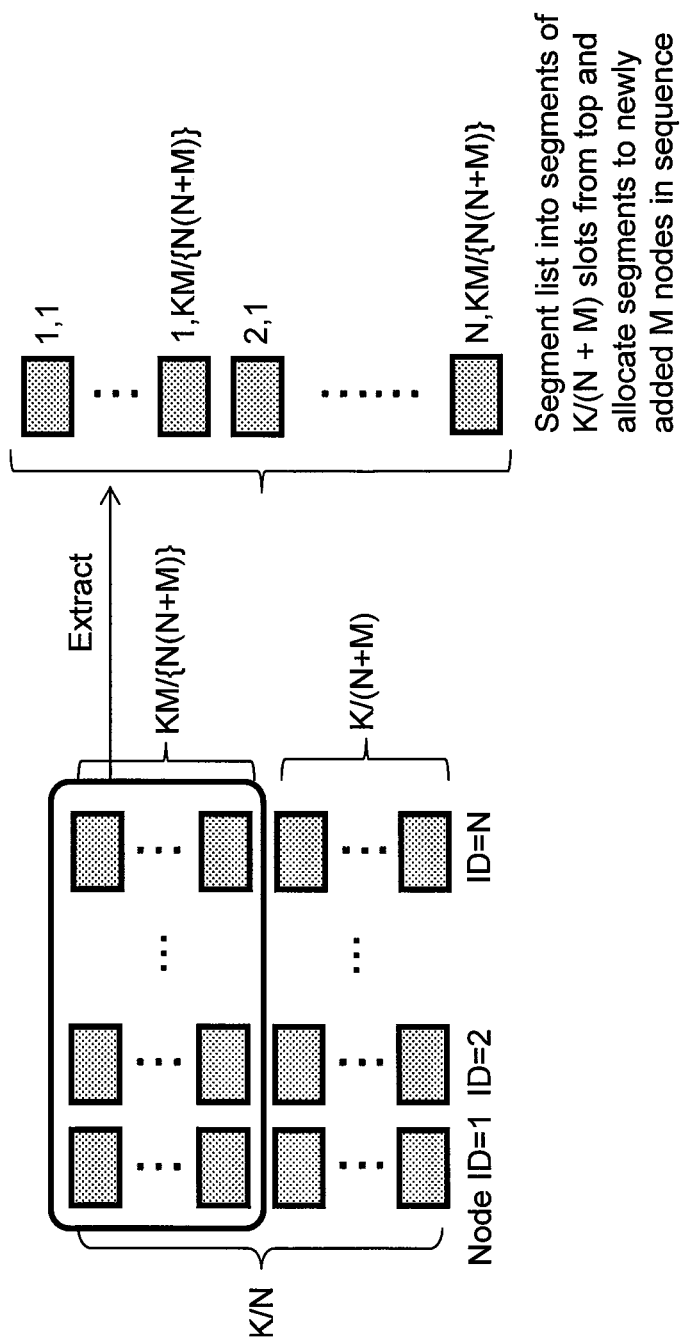
FIG. 4 is a view explaining the concept of slot reallocation processing when M nodes are added to N nodes in the modified mode shown in FIG. 3.

FIG. 4 is a concept view of slot reallocation processing when M nodes are newly added to an information processing system composed of N nodes. The processing explained below is executed in the index management service 112 prepared on one of the servers which constitute the information processing system.

In this case, it is assumed that the total number of slots defined on the circular hash value space is K, the number of existing nodes is N, and the number of additional nodes is M.

First, $KM/\{N(N+M)\}$ slots are extracted from each node and are added in order, to a list (storage region) prepared for reallocation. In FIG. 4, extracted slots are shown with the number allotted thereto. The slots added to the list are numbered by the rule of (node ID, sequence number). The list is prepared in the index management service 112 which manages the reallocation processing. The total number of slots extracted from all of the N nodes is $KM/(N+M)$. In FIG. 4, a range of $KM/\{N(N+M)\}$ slots to be extracted is surrounded with a solid line.

The slots are extracted from each node in ascending order of the slot number which is allocated to each node at the time of executing the reallocation processing, so that the slot number (FIG. 3) given to each node after reallocation of the slots becomes sequential as much as possible.

Once the slots extracted from each node are arrayed on the list, the index management service 112 segments the list into segments of $K/(N+M)$ slots from the top of the list, and allocates the segments to M additional nodes in sequence. As a result, the number of slots allocated to every one of the nodes after completion of reallocation becomes $K/(N+M)$. In other words, it becomes possible to equalize the numbers of documents registered in respective partitioned indexes.

By employing this allocation mode, data (data belonging to each slot) which is moved from the existing nodes to the additional nodes can be clustered as much as possible. This makes it possible to minimize the number of segmenting operations of the index on the existing nodes and to achieve overhead reduction at the time of reconfiguration. Moreover, data movement in this mode is conducted only from existing nodes to additional nodes, so that data movement between existing nodes can be eliminated. Accordingly, the amount of data to be moved can be reduced to the necessary minimum, and partitioned indexes can be reconfigured efficiently.

Figure 5:
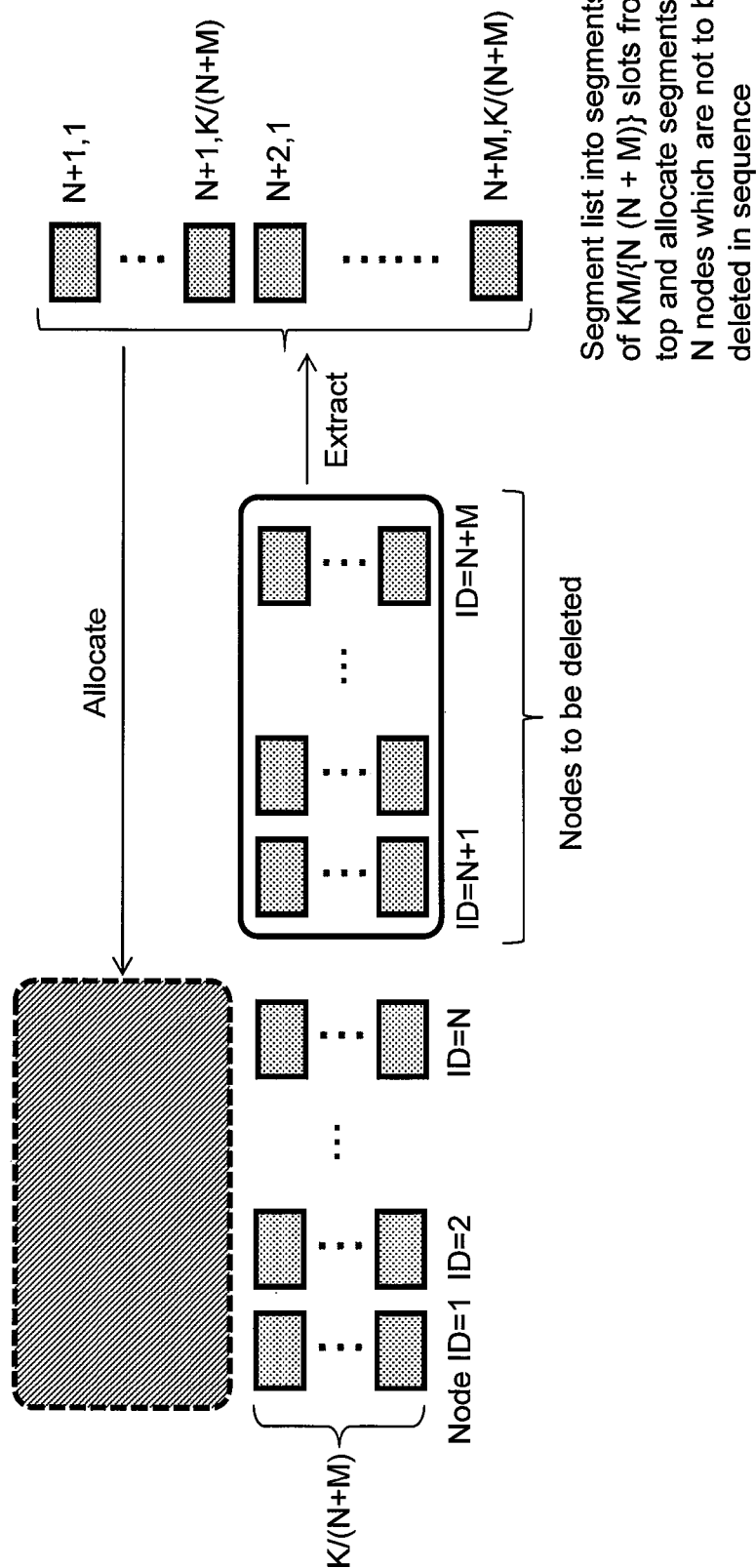
FIG. 5 is a view explaining the concept of slot reallocation processing when M nodes are deleted from N+M nodes in the modified mode shown in FIG. 3.

FIG. 5 is a concept view of slot reallocation processing when M nodes are deleted from an information processing system composed of N+M nodes. The processing explained below is also executed in the indexing module 108 prepared on one of the servers which constitute the information processing system.

It is to be noted that the slot placement after reallocation in FIG. 5 is similar to that explained with reference to FIG. 4. Therefore, K/(N+M) slots are allocated to each of N+M nodes. In this state, K/(N+M) slots are each extracted from M deletion nodes which are deletion targets, and are added in order, to a list (storage region) prepared for reallocation. This list may be identical to or may be different from the list used at the time of addition of nodes. Also in FIG. 5, the slots to be extracted are shown with the number allocated thereto. The slots added to the list are numbered by the rule of (node ID, sequence number). As in the foregoing, the list is prepared in the index management service 112 which manages the reallocation processing. The total number of slots extracted from all of the M nodes is KM/(N+M). In FIG. 5, a region of KM/{N(N+M)} slots to be extracted is surrounded with a solid line.

The slots are extracted from each node in ascending order of the sequence number which is allocated to each node at the time of executing the reallocation processing, so that the slot number (FIG. 3) given to each node after reallocation of the slots becomes sequential as much as possible.

Once the slots extracted from each node are arrayed on the list, the indexing module 108 segments the list into segments of KM/{N(N+M)} slots from the top of the list, and allocates the segments to N remaining nodes which are not to be deleted. As a result, the number of slots allocated to every one of the nodes after completion of reallocation becomes K/N. In other words, it becomes possible to equalize the numbers of documents registered in respective partitioned indexes.

By employing this allocation mode, data (data belonging to each slot) which is moved from the deletion nodes to the remaining nodes can be clustered as much as possible. This makes it possible to minimize the number of segmenting operations of the index on the deletion nodes and to achieve overhead reduction at the time of reconfiguration. Moreover, data movement in this mode is conducted only from deletion nodes to remaining nodes, so that data movement between remaining nodes can be eliminated. Accordingly, the amount of data to be moved can be reduced to the necessary minimum, and partitioned indexes can be reconfigured efficiently.

[Crawling Management Database]

Figures 6, 7:
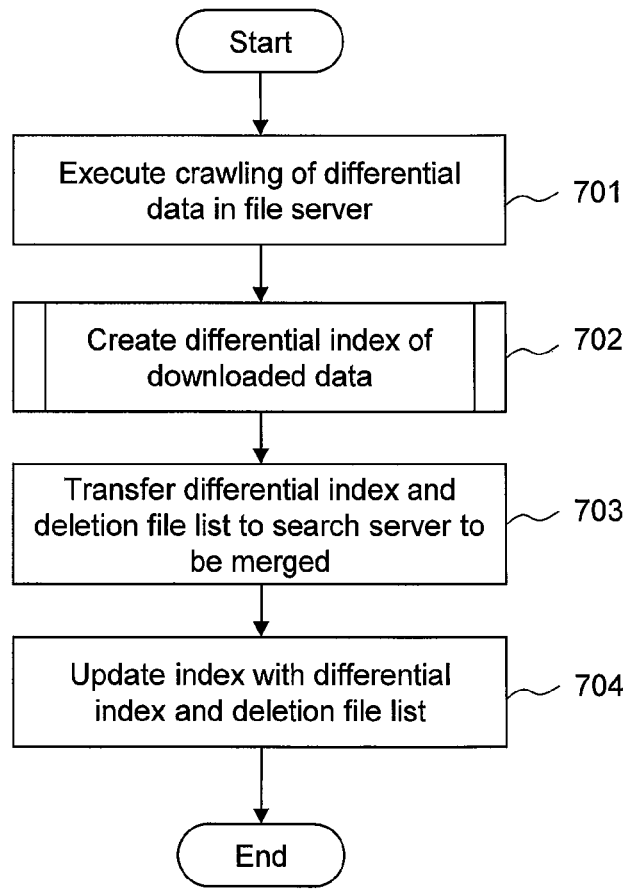
FIG. 6 is a view showing a configuration example of a crawling management DB table.
FIG. 7 is a flow chart explaining indexing processing.

FIG. 6 shows a table example of the crawling management data base 110. With use of the crawling management data base 110, the indexing server 103 detects files which have been changed from the last crawling to the present and creates a differential index. The table includes attribute values of a pathname 601, a hash value 602, and a deletion flag 603. The pathname 601 indicates the path of a file in the file server. The hash value 602 indicates the hash value of metadata on each file. The deletion flag 603 indicates a flag which records whether or not the file is deleted, and takes a value of "0" if the file is remaining and a value of "1" if the file has been deleted.

The deletion flag 603 is set to "1" at the start of crawling, and is set to "0" at the moment when it is confirmed by crawling, that the file exists. By listing the pathnames of entries having the deletion flag 603 set to "1," a deletion file list can be created at the end. The deletion file list is used when the differential index is applied (updated and reflected) to the index on the search node.

[Indexing Processing]

FIG. 7 shows the outline of indexing procedures. First, the indexing server 103 accesses to the file server 102, and executes a processing for crawling differential data (step 701). In the crawling processing, the indexing server 103 calculates a hash value of meta information on each file. The indexing server 103 detects data update by comparison between the calculated hash values and the hash values of the previous crawling recorded on the crawling management data base 110. The indexing server 103 then downloads the files whose update was confirmed, and creates a deletion file list which is a list of deleted file names.

Next, the indexing server 103 creates a differential index based on the downloaded file data (step 702). The indexing server 103 adopts the consistent hashing virtual node mode or the modified consistent hashing virtual node mode to divisionally create a deletion file list according to each partitioned index (corresponding to the search server 104) and to create a differential index.

The indexing server 103 then transfers the created differential index and the deletion file list to the search server 104 storing an index which is to be merged (step 703). The transfer is executed via the LAN 105.

The search server 104 uses the differential index and the deletion file list to update the index 113 included in the search server 104 (step 704).

[Differential Index Creation Processing]

Figure 8:
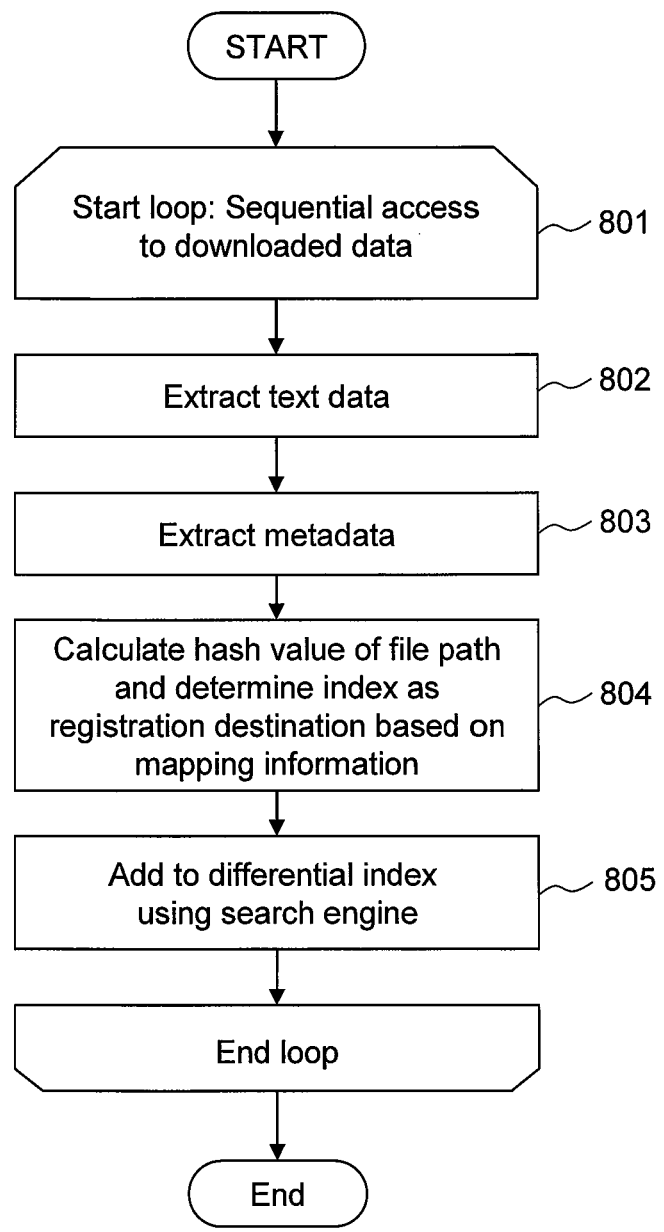
FIG. 8 is a flow chart explaining processing for creating a differential index of download data.

FIG. 8 shows differential index creation procedures which are executed when a differential index is created from download data. The differential index creation processing is executed by the indexing module 108. The indexing module 108 executes serial access to a newly created file group or an updated file group which is downloaded by crawling processing, and executes loop processing for registering the file group into the differential index (step 801).

Once the loop processing is started, the indexing module 108 first extracts text data from file data (step 802). Next, the indexing module 108 extracts metadata from the file data (step 803), and prepares data which are additionally registered into the differential index.

The indexing module 108 then calculates a hash value of a file path, and determines an index into which the pertinent document is registered based on mapping information built in the consistent hash virtual mode or the modified consistent hashing virtual node mode (step 804).

After the index is determined, the indexing module 108 uses the extracted metadata as an input value, and additionally registers the document to the differential index using the search engine 109 (step 805). The loop processing is repeated until all the download data are registered into the differential index.

The differential index created in this processing is an index relating to a file group newly created and updated after the last indexing and updating processing is executed.

[Processing in Node Addition]

Figure 9:
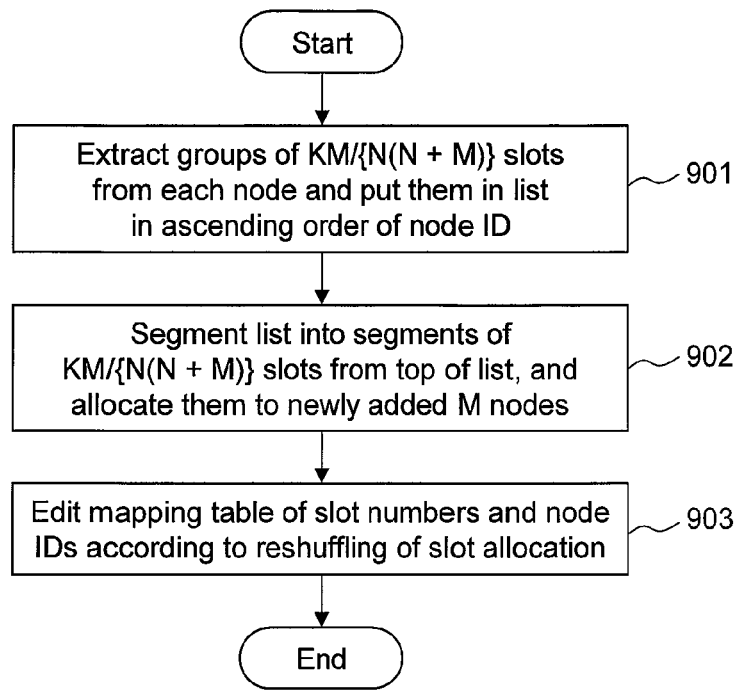
FIG. 9 is a flow chart explaining slot reallocation processing when M nodes are added to N nodes.

FIG. 9 shows slot reallocation procedures executed when M nodes are newly added to an information processing system composed of N nodes. This processing is executed by the index management service 112.

When M nodes are added, the index management service 112 extracts groups of KM/{N(N+M)} slots from N existing nodes, and puts the groups in the list in an ascending order of the node ID (step 901).

Next, the index management service 112 segments the list into segments of K/(N+M) slots from the top of the list, and allocates the segments to newly added M nodes (step 902).

Then, the index management service 112 edits the mapping table of slot numbers and node IDs according to reshuffling of the slot allocation, and updates the mapping information in the modified consistent hashing virtual node mode (step 903). The updated mapping information is used to execute index reconfiguration processing.

[Processing in Node Deletion]

Figure 10:
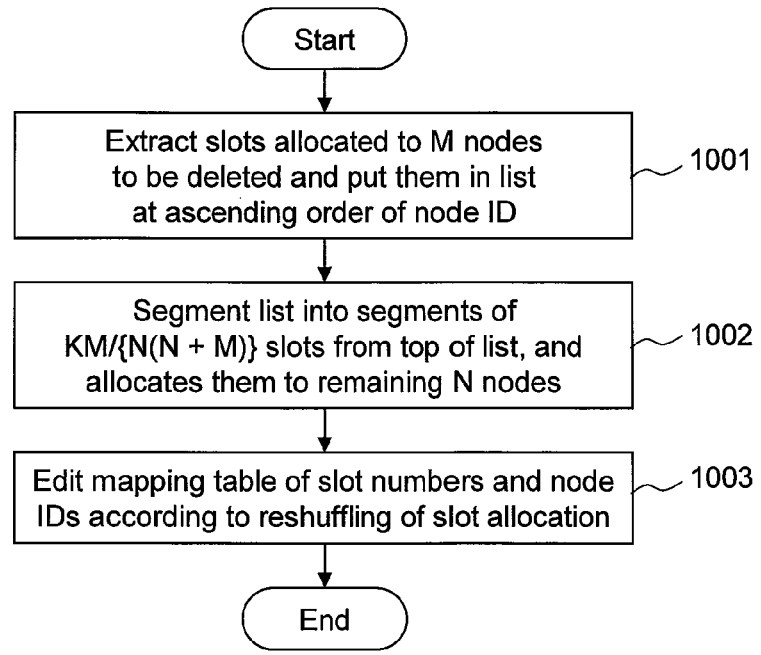
FIG. 10 is a flow chart explaining slot reallocation processing when M nodes are deleted from N+M nodes.

FIG. 10 shows slot reallocation processing procedures executed when M nodes are deleted from an information processing system composed of N+M nodes. When M search servers 104 are deleted from N+M search servers 104, the index management service 112 extracts all the slots allocated to M search servers 104 to be deleted, and puts them in a list in an ascending order of the node ID (step 1001).

Next, the index management service 112 segments the list into segments of KM/{N(N+M)} slots from the top of the list, and allocates the segments to remaining N nodes (search servers 104) (step 1002).

Finally, the index management service 112 edits the mapping table of slot numbers and node IDs according to reshuffling of the slot allocation, and updates the mapping information (step 1003).

[Reconfiguration Processing of Index in Node Addition]

Figure 11:
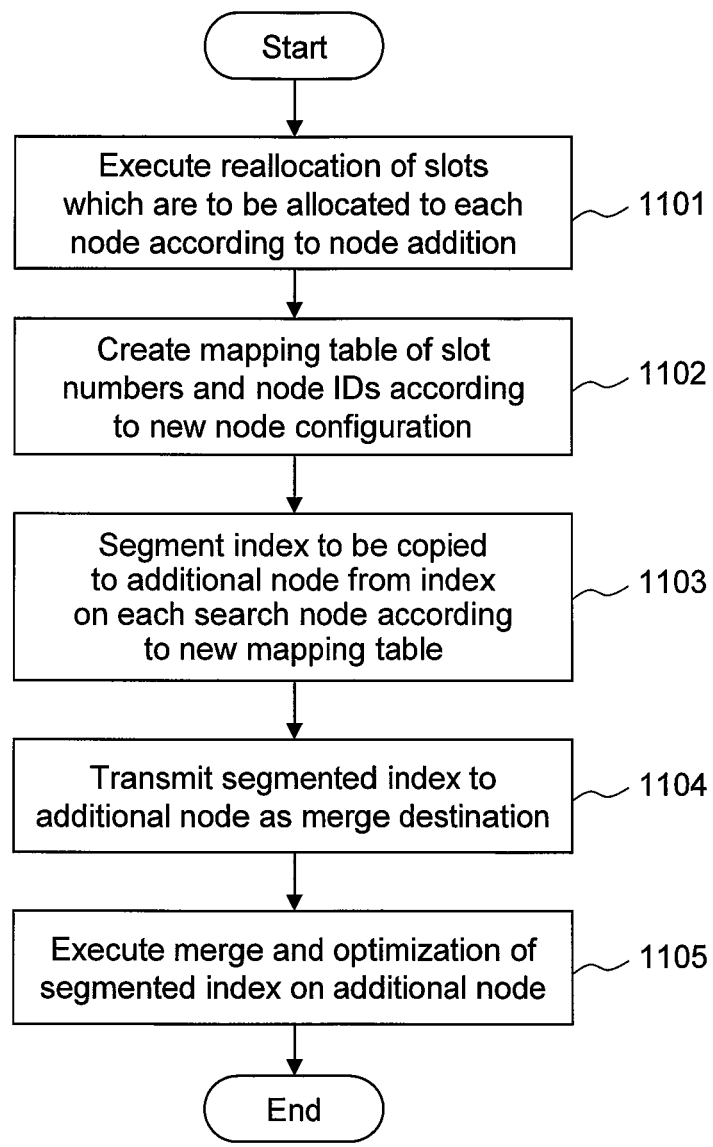
FIG. 11 is a flow chart explaining index reconfiguration processing when nodes are added.

FIG. 11 shows index reconfiguration processing procedures executed when nodes are added. The indexing module 108 executes processing for reallocating the slots to be allocated to each existing node (search server 104) according to addition of nodes (step 1101).

The indexing module 108 then creates a mapping table of slot numbers 302 (FIG. 3) and node IDs according to node configuration after addition of nodes (step 1102).

Once the new mapping table is created, the indexing module 108 segments the index of a document group which should be transferred from each search server 104 before addition of the search servers 104 to additional nodes according to the new mapping table (step 1103).

Then, the indexing module 108 transfers the index segmented from the existing nodes (search servers 104) to additional nodes (search servers 104) (step 1104).

The index management service 112 of the additional node (search server 104) performs merge and optimization processing of the index group segmented and transferred from the existing nodes (step 1105).

[Index Reconfiguration Processing in Node Deletion]

Figure 12:
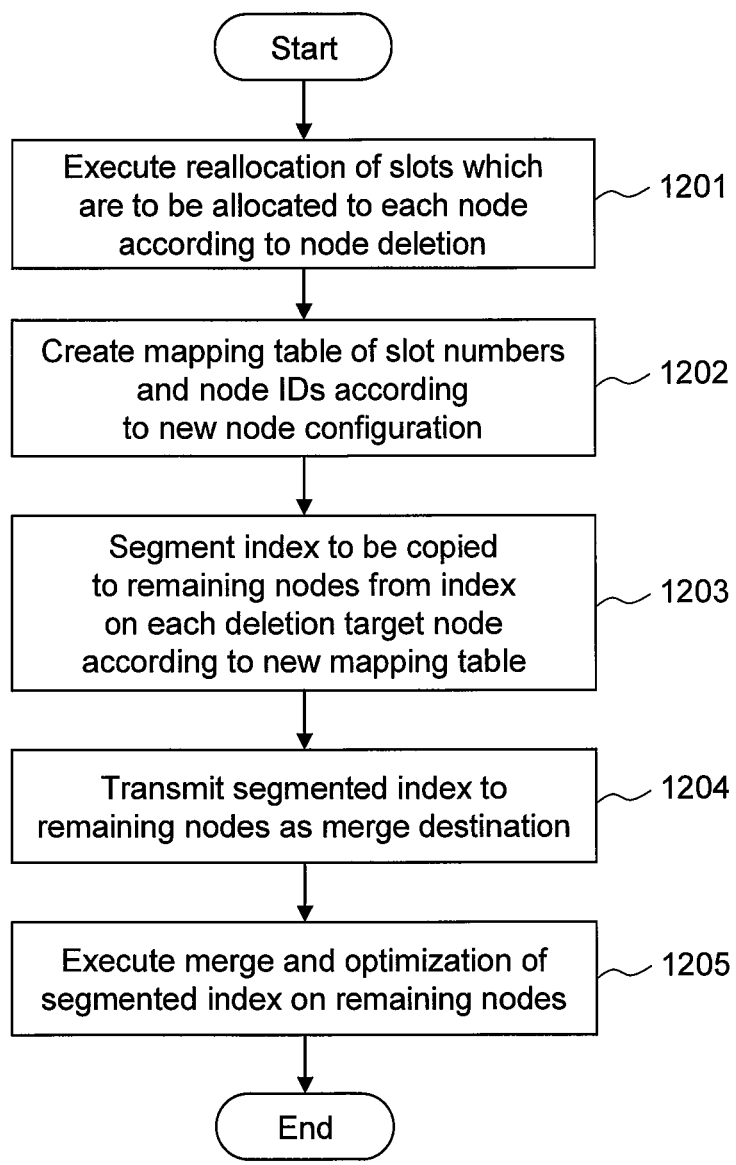
FIG. 12 is a flow chart explaining index reconfiguration processing when nodes are deleted.

FIG. 12 shows index reconfiguration processing procedures executed when nodes are deleted. When the search servers 104 are deleted, the indexing module 108 executes processing for reallocating the slots which are to be allocated to remaining nodes (search servers 104) (step 1201).

Next, the indexing module 108 creates a mapping table of slot numbers and node IDs according to node configuration after deletion of nodes (step 1202).

The indexing module 108 then segments the index of a document group which is to be moved from the index 113 on each deletion node (search server 104) to remaining nodes (search servers 104) according to the new mapping table (step 1203).

Next, the indexing module 108 transmits the segmented index group to a remaining node group to which the index is merged (step 1204).

The index management service 112 of the remaining node (search server 104) performs merge and optimization processing of the index group segmented and transferred from the deletion nodes (step 1205).

[Modified Consistent Hashing Virtual Node Mode (No. 2)]

A description is now given of a second modified consistent hashing virtual node mode. This mode can further save the resource amount required for defining mapping information as compared with the aforementioned first consistent hashing virtual node mode.

FIG. 13 shows the concept of the second modified consistent hashing virtual node. FIG. 13 shows the configuration of mapping table information created for four search servers 104 which have the node ID of 1 to 4.

In this mode (FIG. 13) as in the case of the first modified consistent hashing virtual node mode (FIG. 3), a circular hash space is considered in which 128-bits hash function value 0 and 2^128-1 are assumed to be identical. In this mode (FIG. 13), the circular hash value space is also equally partitioned into K spaces, and each unit space is defined as a slot 301. A slot number 302 is given to each slot 301 counterclockwise in order from the slot including hash value 0.

However, in this mode (FIG. 13), allocation is not determined so that the number of pre-partitioned K slots becomes generally equal in the respective nodes which constitute the information processing system, but partition points are set on a circular hash space so that spaces of generally identical size are allocated to the respective search servers 104.

However, the partition points are placed only at slot boundaries. For example, as shown in FIG. 13, when the circular hash space is allocated to four search servers 104, three partition points are set in a space which divides the entire space into four generally equal spaces. These partition points use the number (slot number 302) of the slot 301 positioned immediately before the pertinent space region.

The information on these partition points is recorded on the mapping table 304, and node IDs corresponding to allocation regions are recorded. In the case of FIG. 13, for example, the space region of node ID=1 corresponds to a space region between the slot numbers m1 and m2. In this case, the space region of node ID=1 is set to have the slot number of m2 and the node ID of 1 in the mapping table 304.

Thus, in the case of this mode (FIG. 13), only the information on the partition points which partition the circular hash space into space regions are held in the mapping table 304. In the case of FIG. 13, the circular hash space is partitioned into four spaces (divided into four spaces) for four search servers 104, and therefore, the mapping table 304 needs to hold only four partition points. Thus, in this mode (FIG. 13), only the necessary minimum information on partition points is held in the mapping table 304, so that the necessary memory resource amount is smaller than that in the first modified consistent hashing virtual node mode (FIG. 3).

Further, the partition points are set at slot boundaries in this mode (FIG. 13). Consequently, even when the regions are fragmented due to addition and deletion of nodes, the maximum size of the mapping table can advantageously be suppressed to the size of the mapping table 304 in the first modified consistent hashing virtual node mode.

A description is now given of hash value space reallocation processing which is executed when the number of search servers 104 which constitute the information processing system is changed. Hereinbelow, the index reallocation processing which is executed when the search servers 104 are added is explained with reference to FIG. 14, and the index reallocation processing which is executed when the search servers 104 are deleted is explained with reference to FIG. 15.

Figure 14:
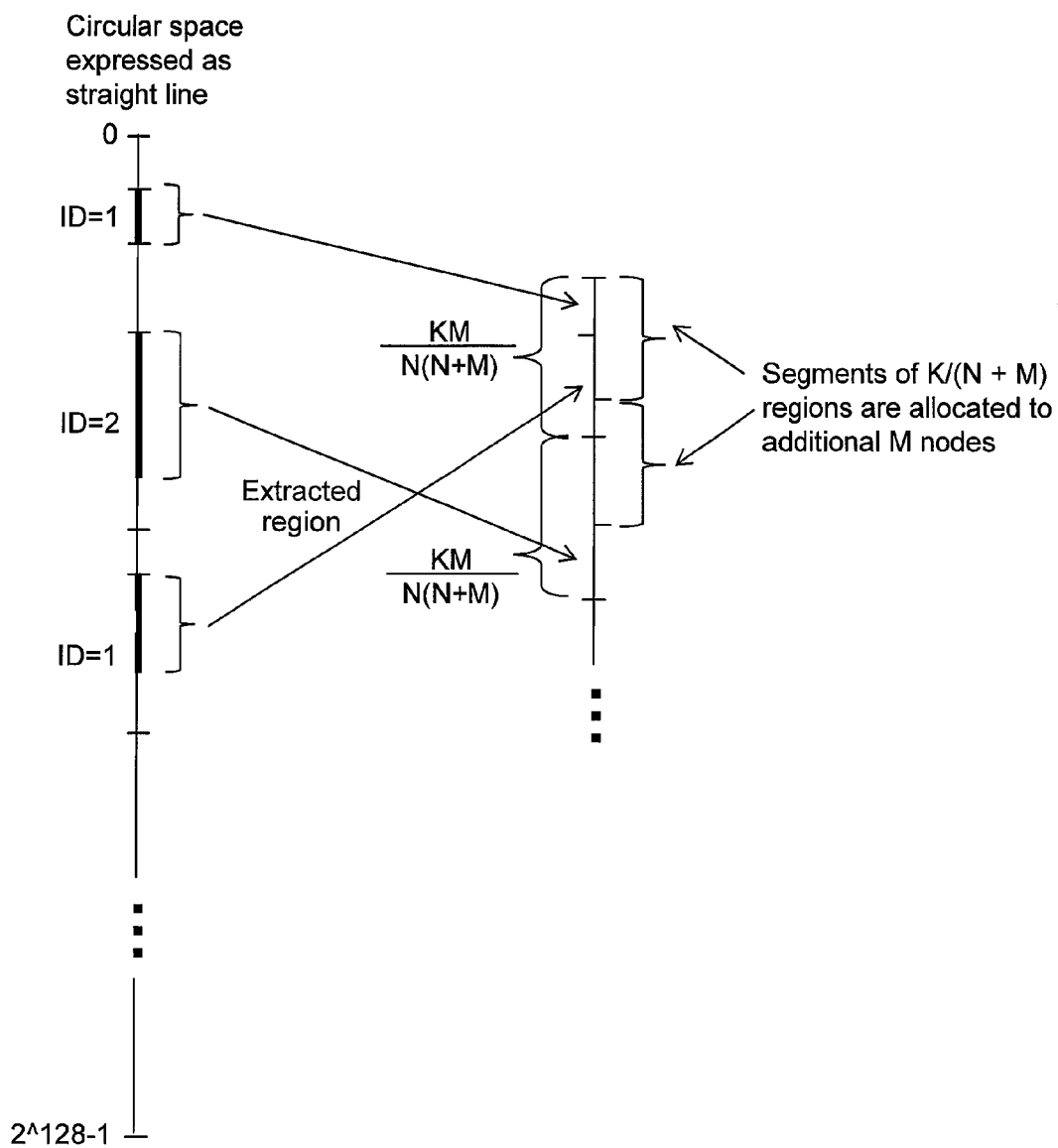
FIG. 14 is a view explaining the concept of hash value space repartition processing when M nodes are added to N nodes in the modified mode shown in FIG. 13.

FIG. 14 is a concept view of hash value space repartition processing when M nodes are newly added to an information processing system composed of N nodes. The processing explained below is executed in the index management service 112 prepared on one of the servers which constitute the information processing system.

In FIG. 14, the circular hash value space is expressed as a linear space to describe the detail of the repartition processing. In an initial state, space regions corresponding to each of N nodes are defined on the circular hash space. It is also assumed that the total number of slots defined on the circular hash value space is K, the number of existing nodes is N, and the number of additional nodes is M.

In the case of FIG. 14, a space region corresponding to a node with ID=1 is partitioned into two space regions and placed on the circular hash space, while a space region corresponding to a node with ID=2 is placed in one clustered space region. When the hash value space is equally partitioned into K regions, the size of each allocated region is expressed by K/N.

It is considered that M nodes are added in this state. In this case, the index management service 112 extracts regions with a size of KM/{N(N+M)} in ascending order of address from the regions allocated to each node. For example, in the case of FIG. 14, the regions drawn with thick lines are extraction regions. It is considered that among the extracted regions, those having the same node ID are connected and they are further connected in ascending order of the node ID to provide a connected region.

The connected region is partitioned into K/(N+M)-size regions, and the partitioned regions are allocated in sequence to additional M nodes. This new partition point is converted into a corresponding address in the original circular hash space. The mapping table 304 is updated based on the corresponding address and the newly allocated node ID.

The corresponding address herein refers to a slot number immediately before the partition point. By using this mode, the regions can be moved from original nodes to newly added nodes in the state of being clustered as much as possible. Consequently, as in the first modified consistent hashing virtual node mode, it becomes possible to minimize the number of segmenting operations of the index at the time of index reconfiguration and to achieve overhead reduction in index reconfiguration.

Figure 15:
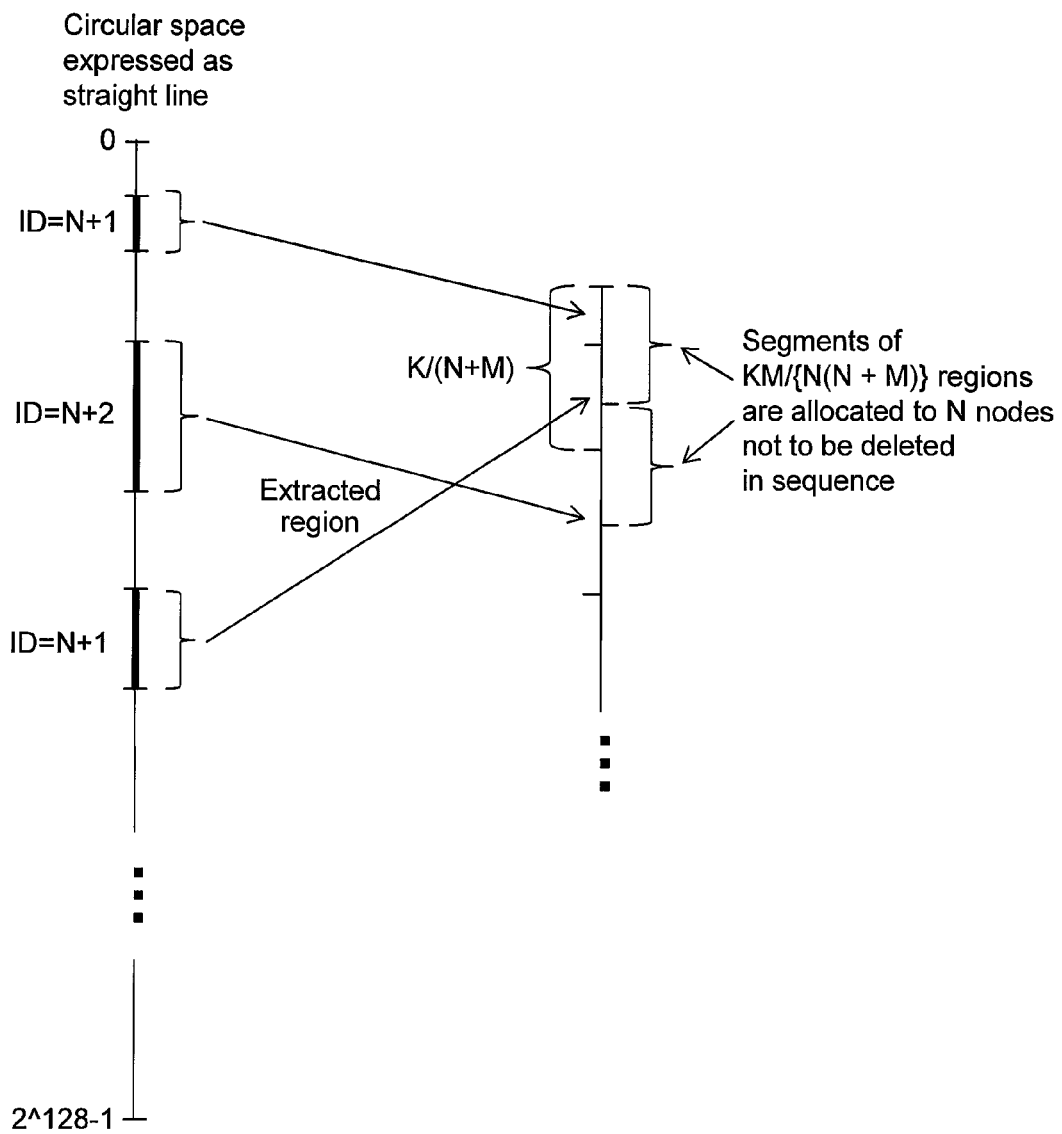
FIG. 15 is a view explaining the concept of hash value space repartition processing when M nodes are deleted from N+M nodes in the modified mode shown in FIG. 13.

FIG. 15 is a concept view of hash value space repartition processing when M nodes are deleted from an information processing system composed of N+M nodes. The processing explained below is also executed in the index management service 112 prepared on one of the servers which constitute the information processing system.

In this case, the node IDs given to the nodes to be deleted are N+1, N+2, ..., N+M. The space regions allocated to the nodes to be deleted are extracted. Among the extracted space regions, a space region group having the same node ID is arrayed and connected in ascending order of the address, and is then connected in ascending order of the node ID to provide a connected region.

The connected region is segmented into segments in the size of KM/{N(N+M)} and the segments are allocated in sequence to N remaining nodes which are not to be deleted. The partition point set at the time of allocation is converted into an address in the circular hash space. Based on the address and the node ID mapped thereto, the mapping table 304 is updated. With this processing, as in the first modified consistent hashing virtual node mode, it becomes possible to minimize the number of segmenting operations of the index at the time of index reconfiguration and to achieve overhead reduction in index reconfiguration.

[Processing in Node Addition]

Figure 16:
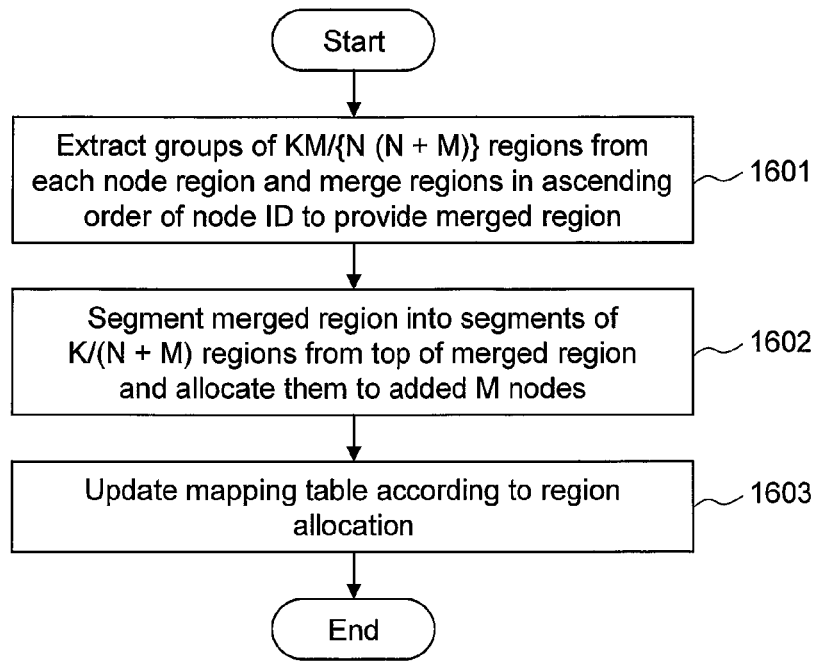
FIG. 16 is a flow chart explaining hash value space repartition processing when M nodes are added to N nodes.

FIG. 16 shows hash value space repartition procedures executed when M nodes are newly added to an information processing system composed of N nodes. This processing is executed by the index management service 112.

When M nodes are added, the index management service 112 extracts regions of KM/{N(N+M)} in slot size from the space region allocated to each node. Among the extracted regions, those having the same ID are merged in ascending order of the address, and then merged in ascending order of the node ID to provide a merged region (step 1601).

Next, the index management service 112 segments the merged region into segments of K/(N+M) regions from the top of the merged region, and allocates the segments to newly added M nodes in sequence (step 1602).

The index management service 112 then updates the mapping table according to allocation of the regions (step 1603). The updated mapping information is used to execute hash value space repartition processing.

[Processing in Node Deletion]

Figure 17:
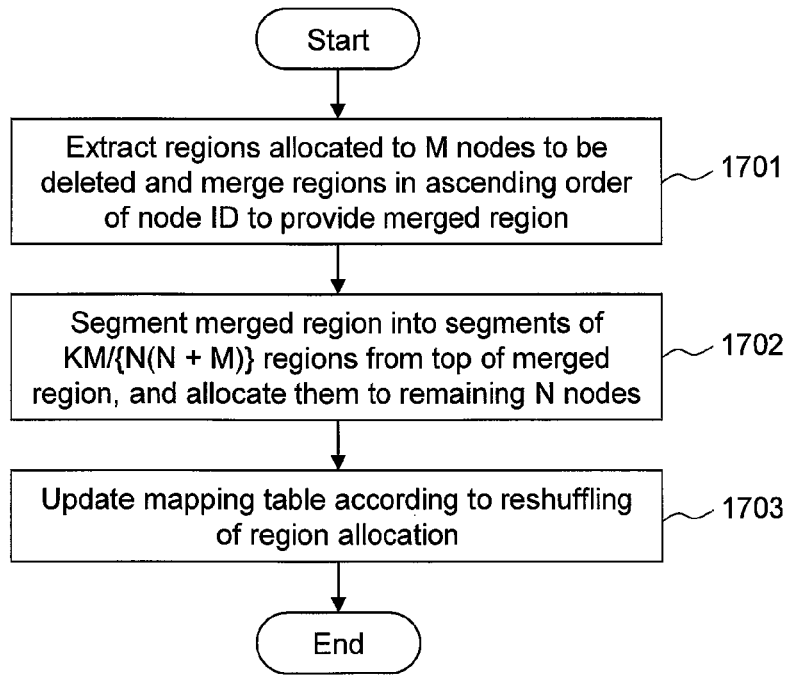
FIG. 17 is a flow chart explaining hash value space repartition processing when M nodes are deleted from N+M nodes.

FIG. 17 shows hash value space repartition processing procedures executed when M nodes are deleted from an information processing system composed of N+M nodes. When M search servers 104 are deleted from N+M search servers 104, the index management service 112 extracts regions allocated to M search servers 104 to be deleted, merges the regions having the same node ID in ascending order of the address, and then merges the regions in ascending order of the node ID to provide the merged region (step 1701).

Next, the index management service 112 segments the merged region into segments of KM/{N(N+M)} regions from the top of the merged region, and allocates the segments to remaining N nodes (search servers 104) in sequence (step 1702).

Finally, the index management service 112 updates the mapping table 304 according to reshuffling of the region allocation (step 1703).

[Conclusion]

With the proposed modes described above, the numbers of registration to each partitioned index can be equalized. According to the proposed modes described above, it further becomes possible to achieve efficient reconfiguration processing which can reduce the amount of resource consumption without generating useless data transition between the existing nodes at the time of addition and deletion of nodes. This make is possible to efficiently register documents into partitioned indexes.

Other Embodiments

It should be understood that the present invention is not limited to the embodiments disclosed and various modified examples are included therein. For example, the above-mentioned embodiments have been described in detail for easy understanding of the present invention. The present invention, therefore, is not necessarily limited to those including all the configuration members described therein. It should also be understood that a part of the configuration in one embodiment may be replaced with the configuration of other embodiments, and the configuration of one embodiment may be added to the configuration of other embodiments. Moreover, it is possible to add, delete or replace other configurations to, from or with a part of the configuration of each embodiment.

Each of the above-described configurations, functions, processing sections, processing means and the like may be implemented in its entirety or in part as an integrated circuit and other hardware, for example. Moreover, each of the above-described configurations, functions and the like may be implemented by a processor interpreting and executing a program which performs each function. In short, they may be implemented as software. Information such as programs, tables and files for performing each function may be stored in storage devices such as memory units, hard disks and SSDs (Solid State Drives) and in memory media such as IC cards, SD cards, and DVDs.

Moreover, control lines and information lines represent only those considered to be necessary for explanation, and do not represent all the control lines and information lines necessary as a product. It may be considered that almost all the structural components are mutually connected in actuality.

DESCRIPTION OF SYMBOLS

101 User terminal
102 File server
103 Indexing server
104 Search server
105 LAN
106 File
107 Crawling module
108 Indexing module
109 Search engine
110 Crawling management DB
111 Search service
112 Index management service
113 Index
201 Virtual node
202 Circular hash value space
301 Slot
302 Slot number
303 Node ID
304 Mapping table
601 Pathname
602 Hash value
603 Deletion flag

What is claimed is:

1. A method of operating an information processing system having a plurality of search nodes connected to a file server over a network, where each of the search nodes and the file server has a computer, a storage device, and a communication device, and the information processing system stores a plurality of indexes, the method comprising:
searching for a file group, including one or more files, which was newly created or updated in the file server;
downloading from the file server the file group which was newly created or updated;
mapping the search nodes by search node IDs to a plurality of slot regions, the slot regions being formed by partitioning at regular intervals a circular hash value space in which a start point and an end point of the hash value space are identical;
calculating a hash value of meta information on each file of the file group and placing the calculated hash value on the circular hash value space so as to detect one of the slot regions including the calculated hash value;
determining a search node ID mapped to the detected slot region;
determining one of the indexes into which each file of the file group is to be registered based on the search node ID of the search node corresponding to the respective file and creating a differential index thereof;
updating the indexes stored in the information processing system using the differential index,
when there are K slot regions defined for N search nodes and M search nodes are newly added, extracting KM/{N(N+M)} slot regions from each of the N existing search nodes and registering the extracted slot regions in a list in order from a top of the list for each search node; and
segmenting the slot regions into segments of K/(N+M) slot regions in order from the top of the list and allocating the segments to search node IDs of the newly added M search nodes, where K, N and M are integers.

2. The method of operating the information processing system according to claim 1, further comprising:
searching for a deleted file group, including one or more files, which was deleted from the file server;
creating a deletion file list relating to the deleted file group; and
updating the indexes stored in the information processing system using the deletion file list.

3. A method of operating an information processing system having a plurality of search nodes connected to a file server over a network, where each of the search nodes and the file server has a computer, a storage device, and a communication device, and the information processing system stores a plurality of indexes, the method comprising:
searching for a file group, including one or more files, which was newly created or updated in the file server;
downloading from the file server the file group which was newly created or updated;
mapping the search nodes by search node IDs to a plurality of slot regions, the slot regions being formed by partitioning at regular intervals a circular hash value space in which a start point and an end point of the hash value space are identical;
calculating a hash value of meta information on each file of the file group and placing the calculated hash value on the circular hash value space so as to detect one of the slot regions including the calculated hash value;
determining a search node ID mapped to the detected slot region;
determining one of the indexes into which each file of the file group is to be registered based on the search node ID of the search node corresponding to the respective file and creating a differential index thereof;
updating the indexes stored in the information processing system using the differential index,
when there are K slot regions placed for N+M search nodes and M search nodes are deleted, extracting K/(N+M) slot regions from each of the deletion target search nodes and registering the extracted slot regions in a list in order from a top of the list for each of the deletion target search nodes; and
segmenting the slot regions into segments of KM/{N(N+M)} slot regions in order from the top of the list and allocating the segments to IDs of remaining N search nodes,
where K, N and M are integers.

4. A method of operating an information processing system having a plurality of search nodes connected to a file server over a network, where each of the search nodes and the file server has a computer, a storage device, and a communication device, and the information processing system stores a plurality of indexes, the method comprising:
searching for a file group, including one or more files, which was newly created or updated in the file server;
downloading from the file server a file group which was newly created or updated;
placing a plurality of representative points corresponding to the search nodes on a circular hash value space in which a start point and an end point of the hash value space are identical;
calculating a hash value of meta information on each file of the file group, placing the calculated hash value on the circular hash value space, and detecting one of the search nodes corresponding to a representative point which is closest to the calculated hash value in a counterclockwise or clockwise direction on the circular hash value space;

determining one of the indexes in which each file of the file group is to be registered based on the detected one of the search nodes and creating a differential index thereof;

updating the indexes stored in the information processing system using the differential index when there are K slot regions defined for N search nodes and M search nodes are newly added, extracting KM/{N(N+M)} slot regions from each of the N existing search nodes and registering the extracted slot regions in a list in order from a top of the list for each search node; and segmenting the slot regions into segments of K/(N+M) slot regions in order from the top of the list and allocating the segments to search node IDs of the newly added M search nodes, where K, N and M are integers.

5. The method of operating the information processing system according to claim 4, further comprising placing, when a new search node is added to the information processing system, a representative point corresponding to the new search node onto the circular hash value space, and deleting, when one of the search nodes is deleted from the system, a representative point corresponding to the deleted search node from the circular hash value space.

6. The method of operating the information processing system according to claim 4, further comprising:

searching for a deleted file group, including one or more files, which was deleted from the file server;

creating a deletion file list relating to the deleted file group; and updating the indexes stored in the information processing system using the deletion file list.

7. A method of operating an information processing system having a plurality of search nodes connected to a file server over a network, where each of the search nodes and the file server has a computer, a storage device, and a communication device, and the information processing system stores a plurality of indexes, the method comprising:

searching for a file group, including one or more files, which was newly created or updated in the file server;

downloading from the file server a file group which was newly created or updated;

defining a plurality of slot regions formed on a circular hash value space in which a start point and an end point of the hash value space are identical, the slot regions being formed by partitioning the circular hash value space at regular intervals, mapping the search nodes to the slot regions such that the circular hash value space is equally partitioned into plural partitions at boundaries between the slot regions and each search node corresponds to one of the partitions having plural contiguous slots regions;

calculating a hash value of meta information on each file of the file group and placing the calculated hash value on the circular hash value space so as to detect one of the slot regions including the calculated hash value;

determining one of the search nodes mapped to the detected one of the slot regions;

determining one of the indexes in which each file of the file group is to be registered based on the respective one of the mapped search nodes and creating a differential index thereof;

updating one of the indexes stored in the information processing system using the differential index, when there are K slot regions defined for N search nodes and M search nodes are newly added, extracting KM/{N(N+M)} slot regions from each of the existing N search nodes and registering the extracted slot regions in a list in order from a top of the list for each search node; and segmenting the slot regions into segments each corresponding to K/(N+M) slot regions in order from the top of the list and allocating the segments to the newly added M search nodes, where K, N and M are integers.

8. The method of operating the information processing system according to claim 7, further comprising:

managing the partitions by allocation of the segments according to the slot regions positioned at a boundary between the partitions.

9. The method of operating the information processing system according to claim 7, further comprising:

searching for a deleted file group, including one or more files, which was deleted from the file server;

creating a deletion file list relating to the deleted file group; and updating the indexes stored in the information processing system using the deletion file list.

10. A method of operating an information processing system having a plurality of search nodes connected to a file server over a network, where each of the search nodes and the file server has a computer, a storage device, and a communication device, and the information processing system stores a plurality of indexes, the method comprising:

searching for a file group, including one or more files, which was newly created or updated in the file server;

downloading from the file server a file group which was newly created or updated;

defining a plurality of slot regions formed on a circular hash value space in which a start point and an end point of the hash value space are identical, the slot regions being formed by partitioning the circular hash value space at regular intervals, mapping the search nodes to the slot regions such that the circular hash value space is equally partitioned into plural partitions at boundaries between the slot regions and each search node corresponds to one of the partitions having plural contiguous slots regions;

calculating a hash value of meta information on each file of the file group and placing the calculated hash value on the circular hash value space so as to detect one of the slot regions including the calculated hash value;

determining one of the search nodes mapped to the detected one of the slot regions;

determining one of the indexes in which each file of the file group is to be registered based on the respective one of the mapped search nodes and creating a differential index thereof;

updating one of the indexes stored in the information processing system using the differential index, when there are K slot regions defined for N search nodes and M search nodes are deleted, extracting K/(N+M) slot regions from each of the deletion target search nodes and registering the extracted slot regions in a list in order from a top of the list for each of the deletion target search nodes; and segmenting the slot regions into segments each corresponding to KM/{N(N+M)} slot regions in order from the top of the list and allocating the segments to the remaining N search nodes.

11. The method of operating the information processing system according to claim 10, further comprising:
   managing the partitions by allocation of the segments according to the slot regions positioned at a boundary between the partitions.

* * * * *